United States Patent
Rimoto et al.

(10) Patent No.: US 6,471,585 B1
(45) Date of Patent: Oct. 29, 2002

(54) BALL-GAME-TYPE GAME PROGRAM, COMPUTER-READABLE RECORDING MEDIUM ON WHICH SUCH A PROGRAM IS RECORDED, AND BALL-GAME-TYPE GAME PROCESSING APPARATUS AND METHOD

(75) Inventors: Shiyu Rimoto, Tokyo; Tomoaki Yoshinobu, Hyogo, both of (JP)

(73) Assignee: Square Co., Ltd., Tokyo (JP)

( * ) Notice: Subject to any disclaimer, the term of this patent is extended or adjusted under 35 U.S.C. 154(b) by 18 days.

(21) Appl. No.: 09/628,284

(22) Filed: Jul. 28, 2000

(30) Foreign Application Priority Data

May 12, 2000 (JP) ........................................ 2000-140881

(51) Int. Cl.$^7$ ................................................. A63F 9/24
(52) U.S. Cl. ............................ 463/4; 463/1; 273/317.1; 273/317; 273/317.3; 273/317.5; 273/317.6
(58) Field of Search ................................ 463/1–4, 5–8, 463/36, 30–33; 273/317.1, 317.4, 317.3, 317.5, 317.6; 345/473, 418, 428, 433, 441, 439, 474, 112, 121, 127; 434/16, 12, 37, 43, 61–62, 69, 307 R, 308–309

(56) References Cited

U.S. PATENT DOCUMENTS 5,767,861 A * 6/1998 Kimura ....................... 345/473
5,863,248 A * 1/1999 Mine et al. ...................... 463/4
6,149,520 A * 11/2000 Takatsuka ....................... 463/4
6,183,363 B1 * 2/2001 Ishihara et al. ............... 463/31
6,196,917 B1 * 3/2001 Mathias et al. ................. 463/2
6,203,425 B1 * 3/2001 Hayashi .......................... 463/1
6,244,956 B1 * 6/2001 Nakayama et al. ............. 463/3
6,120,374 A1 * 9/2001 Akada et al. ................... 463/3

FOREIGN PATENT DOCUMENTS

JP          2-502473        8/1990
WO          89/05404        6/1989

OTHER PUBLICATIONS

"Sega Saturn, NHL Powerplay '96", SEGA, published 1996.
"1998 Koshien Baseball Tournament Offical Perfect Guidebook", p. 93, ASCII Corporation, Jul. 23, 1998.

* cited by examiner

Primary Examiner—Jessica Harrison
Assistant Examiner—Y Cherubin
(74) Attorney, Agent, or Firm—Greenblum & Bernstein, P.L.C.

(57) ABSTRACT

Input of a manipulation by a user is accepted before a player receives the ball. Upon occurrence of input of a manipulation, motion of the player including catching and throwing of the ball is determined in response to the input of the manipulation. By using the motion, transitions of display is made from a state before a catch of the ball by the player to a throw of the ball.

12 Claims, 9 Drawing Sheets

| FIELDER ID | MOTION DATA | NUMBER OF FRAMES |
|---|---|---|
| 1 | #1 | 20 |
|   | #2 | 20 |
|   | #3 | 10 |
| 2 | #4 | 20 |
|   | #5 | 20 |
|   | #6 | 10 |
| 3 | #7 | 20 |
|   | #8 | 20 |
|   | #9 | 10 |
| ⋮ | ⋮ | ⋮ |

BALL-GAME-TYPE GAME PROGRAM, COMPUTER-READABLE RECORDING MEDIUM ON WHICH SUCH A PROGRAM IS RECORDED, AND BALL-GAME-TYPE GAME PROCESSING APPARATUS AND METHOD

The present disclosure relates to subject matter contained in Japanese Patent Application No. 2000-140881, filed on May 12, 2000, the disclosure of which is expressly incorporated herein by reference its entirety.

BACKGROUND OF THE INVENTION

1. Field of the Invention

The present invention relates to a ball-game-type game program for controlling players and the ball in a ball-game-type game, a computer-readable recording medium on which such a program is recorded, and a ball-game-type game processing apparatus and method.

2. Description of the Related Art

At present, in sport games, not only are one-against-one confrontation games available, but also multiplayer against multiplayer confrontation games such as tennis, soccer, basketball, American football, and baseball are available.

To advance such a sport game, it is necessary to input manipulations through a manipulation unit (a manipulation panel, a keypad, or the like) that is provided in advance in an arcade machine or a game-dedicated machine (e.g., PlayStation (trademark) manufactured by Sony Computer Entertainment Inc. or Dreamcast (trademark) manufactured by Sega Enterprises, Ltd.).

In general, the manipulation unit has multiple keys (or buttons) and a joystick. In both sport games and role-playing games, a manipulation system is formed by a limited number of buttons and joysticks on the manipulation unit. Naturally, games can be realized on personal computers. Where a keyboard is used, keys necessary for manipulation of a game are assigned to keys of the keyboard.

In ball games such as baseball, soccer, and basketball among sport games, usually the movement of the ball itself cannot be manipulated by buttons or a joystick. Instead, it is possible to manipulate the movement direction and the force of the ball indirectly by a user's manipulating the movement of a player with respect to the coming ball.

In a baseball game, when the batted ball goes toward the shortstop in a state that no runner exists, it is possible to cause the shortstop to catch the ball if the shortstop is located in a movement range where it can catch the ball. If a manipulation for instructing to throw the ball to the first base is input by a user at the time of a catch, the ball is thrown by the shortstop to the first base. If the first baseman has already covered the first base, the ball thus thrown is caught by the first baseman. In this manner, it is possible to command, by a user's input of a manipulation (button manipulation), where to throw the ball when the shortstop has the ball.

This type of technique is disclosed in Japanese Patent No. 2502473. This patent discloses a technique in which a base as a throwing destination of the ball is determined in response to a user's button manipulation after a judgment that a fielder caught the ball and the ball is moved to the determined base.

Conventionally, as exemplified by the technique of the above patent, a manipulation to command a movement destination (a base in the patent) of the ball is input when a player (a fielder in the patent) has received (has caught in the patent) the ball. Therefore, a user needs to carefully watch the player receive the ball to recognize the moment of the reception.

Therefore, in a baseball game, there may occur a case that a user who is not accustomed to manipulation cannot input a manipulation immediately when a fielder has caught the ball and hence loses a chance of putting the batter or a runner out.

Further, in the case of a user who is not accustomed to manipulation, there may occur a case that a manipulation input is not accepted though he has already determined a throwing destination before a fielder catches the ball. This type of poor performance of manipulation may impose stress on the user.

Although a detailed description has been made of a baseball game, similar problems may occur in other ball games such as soccer, basketball, tennis, American football, and ice hockey.

SUMMARY OF THE INVENTION

An object of the present invention is to provide a ball-game-type game program, a computer-readable recording medium on which such a program is recorded, and a ball-game-type game processing apparatus and method which can improve the balance between the movements of displayed players and the ease of operation of a user in a ball-game-type game, to thereby realize smooth development of the game.

To attain the above object, a first aspect of the invention provides a computer-readable recording medium on which a ball-game-type game program for realizing a ball-game-type game in which movements of players and a ball on a screen are controlled, the program causing a computer to execute: accepting input of a manipulation by a user before a player receives a ball; judging, in response to the input of the manipulation by the user, a direction in which the player should move the ball; and displaying motion of the player of moving the ball in the judged direction.

A second aspect of the invention provides a computer-readable recording medium on which a ball-game-type game program for realizing a ball-game-type game in which movements of players and a ball on a screen are controlled, the program causing a computer to accept input of a manipulation by a user before a player receives a ball; when the input of the manipulation by the user is accepted before the player receives the ball, judge, in response to the input of the manipulation by the user, a direction in which the player should move the ball; and display motion of the player of moving the ball in the judged direction. The motion starts from a state before the player receives the ball.

A third aspect of the invention provides a ball-game-type game program for realizing a ball-game-type game in which movements of players and a ball on a screen are controlled. The program causes a computer to accept input of a manipulation by a user before a player receives a ball; judge, in response to the input of the manipulation by the user, a direction in which the player should move the ball; and display motion of the player moving the ball in the judged direction.

A fourth aspect of the invention provides a ball-game-type game program for realizing a ball-game-type game in which movements of players and a ball on a screen are controlled, the program causing a computer to accept input of a manipulation by a user before a player receives a ball; when the input of the manipulation by the user is accepted before the player receives the ball, judge, in response to the input of the manipulation of the user, a direction in which the player should move the ball; and display motion of the player moving the ball in the judged direction, the motion starting from a state before the player receives the ball.

A fifth aspect of the invention provides a ball-game-type game processing apparatus including a computer-readable recording medium on which a program for realizing a ball-game-type game in which a movement of a ball is controlled indirectly so as to conform to a movement of a player; a computer for reading and executing at least part of the program; and a display for displaying the ball-game-type game realized by the program. The computer, by reading the at least part of the program from the recording medium, accepts input of a manipulation by a user before a player receives a ball; judges in response to the input of the manipulation by the user, a direction in which the player should move the ball; and displays, on the display, motion of the player moving the ball in the judged direction.

A sixth aspect of the invention provides a ball-game-type game processing apparatus including a computer-readable recording medium on which a program for realizing a ball-game-type game in which a movement of a ball is controlled indirectly so as to conform to a movement of a player; a computer for reading and executing at least part of the program; and a display for displaying the ball-game-type game realized by the program. The computer, by reading at least part of the program from the recording medium, accepts input of a manipulation by a user before a player receives a ball; when the input of the manipulation by the user is accepted before the player receives the ball, judges, in response to the input of the manipulation by the user, a direction in which the player should move the ball; and displays, on the display, motion of the player of moving the ball in the judged direction, the motion starting from a state before the player receives the ball.

A seventh aspect of the invention provides a ball-game-type game processing method for realizing a ball-game-type game in which movements of players and a ball on a screen are controlled. The method includes accepting input of a manipulation by a user before a player receives a ball; judging, in response to the input of the manipulation by the user, a direction in which the player should move the ball; and displaying motion of the player of moving the ball in the judged direction.

An eighth aspect of the invention provides a ball-game-type game processing method for realizing a ball-game-type game in which movements of players and a ball on a screen are controlled. The method includes accepting input of a manipulation by a user before a player receives a ball; when the input of the manipulation by the user is accepted before the player receives the ball, judging, in response to the input of the manipulation of the user, a direction in which the player should move the ball; and displaying motion of the player of moving the ball in the judged direction, the motion starting from a state before the player receives the ball.

DETAILED DESCRIPTION OF THE PREFERRED EMBODIMENT

An embodiment of the present invention will be hereinafter described in detail with reference to the accompanying drawings. The following description will be directed to a baseball game as an example of ball-game-type games.

Figure 1:
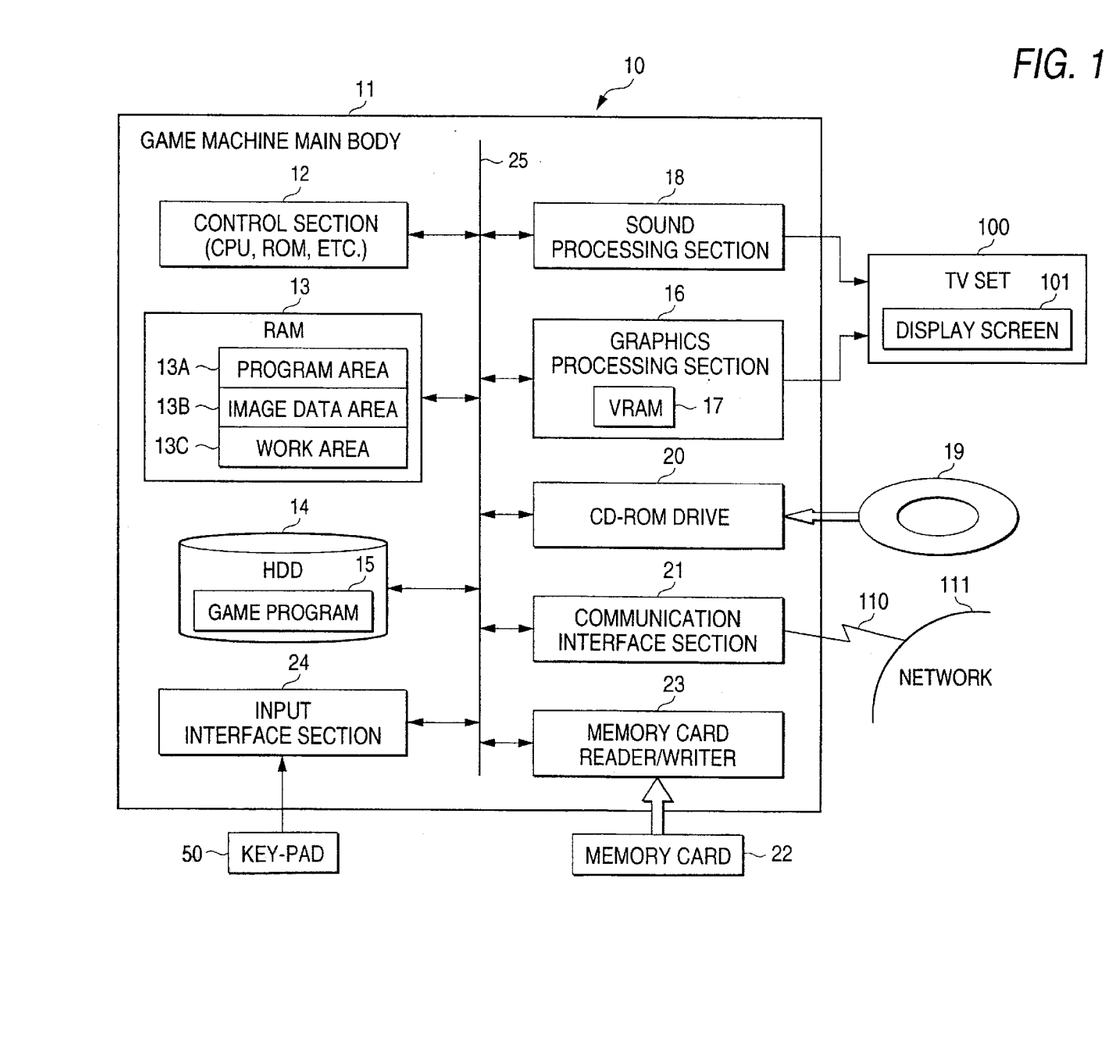
FIG. 1 is a block diagram showing an example apparatus configuration according to an embodiment of the invention.

First, the configuration will be described with reference to FIG. 1. FIG. 1 shows an example configuration of a video game machine according to an embodiment of the invention. The video game machine 10 shown in FIG. 1 has functions of a ball-game-type game processing apparatus according to the invention. The video game machine 10 executes a program that is recorded on a computer-readable recording medium according to the invention. The video game machine 10 executes a program according to the invention. The video game machine 10 is used in practice of a ball-game-type game processing method according to the invention.

For example, the video game machine 10 is provided with a game machine main body 11 for processing a video game according to a program, a keypad 50 for manipulating a video game interactively, and a television set (hereinafter referred to as "TV set") 100 having a CRT monitor or the like as a monitor having speakers. Also provided with a communications interface section 21, the video game machine 10 is connected to a network 111 via a communications line 110 and performs data communications with another apparatus.

Provided with buttons and a joystick in such a manner that they can be manipulated by a user (operator), the keypad 50 provides the game machine main body 11 with a command corresponding to a button manipulation or a joystick manipulation by a user. The buttons and the joystick have a function of inputting various manipulations of a baseball game (described later) such as a manipulation of throwing of the pitcher, a manipulation of a swing of the batter, a manipulation of base stealing by a runner, and a manipulation of catching/throwing by a fielder. Based on a video signal and a sound signal that are output from the game machine main body 11, the TV set 100 displays a picture on a display screen 101 and performs sound output in accordance with a game situation.

The game machine main body 11 has an internal bus 25, to which a control section 12 having units such as a CPU and a ROM, a RAM 13, and a hard disk drive (hereinafter referred to as HDD) 14 are connected.

The control section 12 controls the entire apparatus and performs game processing by storing part or all of a program in the RAM 13. A program and data to be read out when the game machine main body 10 is turned on are stored in the ROM 12 in advance.

The RAM 13 has a program area 13A, an image data area 13B, a work area 13C, etc. A game program is stored in the program area 13A. Specifically, part or all of a game program that are read by a CD-ROM drive 20 from a CD-ROM 19 is stored in the program area 13A. Image data of a background, a game character, or the like that are necessary during execution of a program are stored in the image data area 13B. Various data that are generated during execution of a program are stored in the work area 13C.

A game program and image data can be supplied from the HDD 14 as well as the CD-ROM 19. Where a game program and image data are supplied from the HDD 14, they may be stored in the hard disks 15 in the HDD 14. A game program and image data may be stored in the hard disks 15 by advance installation or downloading from the network 111 via the communications line 110.

An input interface section 24, a sound processing section 18, and a graphics processing section 16 are connected to the internal bus 25. The keypad 50 is connected to the internal bus 25 via the input interface section 24. The TV set 100 is connected to the internal bus 25 via the sound processing section 18 and the graphics processing section 16.

The graphics processing section 16 is provided with a VRAM 17 having a frame buffer. The graphics processing section 16 generates a video signal based on image data that is stored in the frame buffer according to commands that are supplied from the control section 12 during execution of a program, and outputs the generated video signal to the TV set 100. As a result, a picture is displayed on the display screen 101 of the TV set 100 based on the image data stored in the frame buffer.

The sound processing section 18 generates a sound signal of BGM (background music), sound effects, or the like according to commands that are supplied from the control section 12, and outputs the generated sound signal to the TV set 100.

The CD-ROM drive 20 and a memory card reader/writer 23 are also connected to the internal bus 25. The CD-ROM drive 20 reads out a game program, image data, sound data, etc. that are stored in the CD-ROM 19 as a recording medium. The memory card reader/writer 23 writes and reads data to and from a memory card 22 under the control of the control section 12. Examples of data to be written to the memory card 22 are data indicating an intermediate state of a game and data indicating an environmental setting of a game.

Next, a description will be made of a relationship between state transitions and manipulations according to one embodiment. FIGS. 2A–2G illustrate, by using state transitions, an example of catching motion according to an embodiment. FIGS. 3A–3G illustrate, by using state transitions, an example of motion from catching to throwing according to an embodiment. FIGS. 4A–4G illustrate, by using state transitions, another example of motion from catching to throwing according to an embodiment.

First, a description will be made of a case where there is no manipulation input that commands a throwing destination. FIGS. 2A–2G show example state transitions of catching motion. In FIGS. 2A–2G, reference numeral 101 denotes a display screen, 61 denotes a fielder, 62 denotes a glove, and 70 denotes a ball.

Figure 2A:
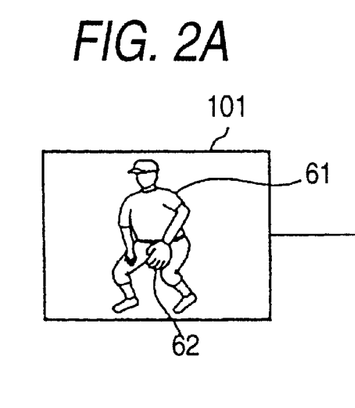
FIGS. 2A–2G illustrate an example catching motion according to an embodiment.

In FIG. 2A, the fielder 61 has a posture of preparing for a catch in a state that he wears the glove 62 on his left hand. If the fielder 61 can be manipulated, a user's manipulation input for the fielder 61 can be accepted even from a time point when the ball 70 is batted by the batter or another fielder throws the ball 70. The user can specify a desired throwing destination by manipulating the keypad 50.

The throwing destination means a fielder, more specifically, a fielder that will cover the first base, a fielder that will cover the second base, a fielder that will cover the third base, or a fielder that will cover home plate. When the batted ball has reached the outfield and, for example, a manipulation has been made for the fielder that will cover home plate, a more realistic play can be expressed by causing a relay player to catch the ball.

Even if the fielder 61 has been determined as a player to catch the ball 70 but no manipulation for determining a throwing destination has been input yet, at least motion to catch is determined approximately at the same time as the determination of the fielder 61 as a player to catch the ball 70. As a result, motion of the fielder 61 to perform a catch is started. A player that should catch the ball 70 is determined by computation by the computer. In the computation by the computer, in response to the user's manipulations (button manipulations, joystick manipulations, etc.) for fielders, a fielder that can reach the ball 70 earliest is determined from among one or more fielders close to the path of the ball 70.

In this example, the fielder 61 is determined as a player to catch the ball 70. The motion that is determined at this time is waiting motion that continues after a catch until input of a manipulation. However, where high-level motion processing is demanded, the most appropriate throwing destination may be determined in accordance with a state of game progress, that is, in accordance with the presence/absence of runners, the states of the fielders, and other factors. The term "emotion" as used here means motion that is suitable for catching of the ball 70 by a fielder and throwing of the ball 70 to the most appropriate throwing destination (i.e., a fielder that is covering the most appropriate base).

As for the management of motion, multiple kinds of motion may be associated with each fielder or motion may be shared by fielders. Associating multiple kinds of motion with each fielder independently makes it possible to emphasize a realistic expression. On the other hand, motion sharing among fielders makes it possible to simplify the data management and motion expressions.

Figure 2B:
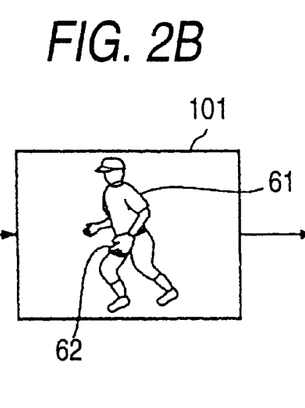

When the motion thus determined has been started, as shown in FIG. 2B the motion control is passed to the computer and the fielder 61 is controlled so as to move toward a position to which the ball 70 will reach (rightward in the example of FIG. 2B).

Figure 2C:
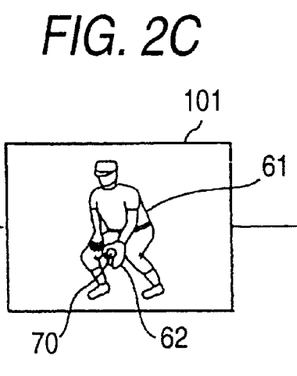

When the player 61 has reached the position of the ball 70 after moving to the path of the ball 70, the motion of fielder 61 catching the ball 70 is displayed as shown in FIG. 2C. At this time, the accuracy of the motion display is increased by correcting the position of the glove 62 by image processing. This may be done by predicting a position to which the ball 70 will reach and moving the glove 62 to that position.

Figure 2D:
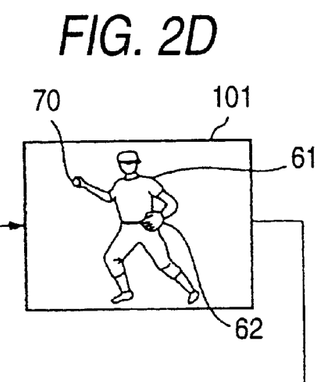

After the catch, as shown in FIG. 2D, the motion control makes a transition to motion immediately before a throw by the fielder 61. Where high-level motion processing is used, if, for example, a fielder as the most appropriate throwing destination is a fielder that is covering the second base, intermediate motion before throwing of the ball 70 to that fielder is displayed.

Figure 2E:
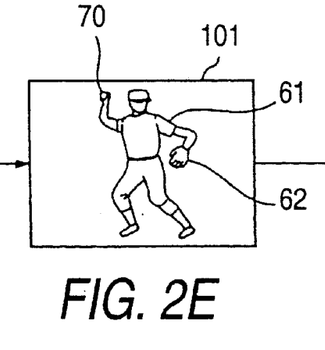

Then, as shown in FIG. 2E, the fielder 61 is given a posture immediately before throwing of the ball 70 to the most appropriate throwing destination (e.g., a fielder that is covering the second base). In this example, since no manipulation is input before or after the catch of the ball 70 by the fielder 61, the motion control makes transitions to states of FIGS. 2F and 2G.

Figure 2F:
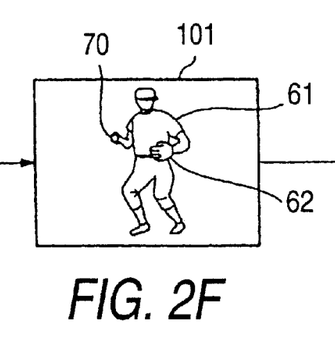
Figure 2G:
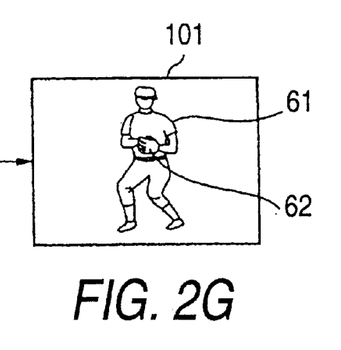

If no manipulation has been input even when the fielder 61 is given the throwing posture (see FIG. 2E), motion that the fielder 61 lowers his arm that holds the ball 70 is displayed as shown in FIG. 2F. Then, the fielder 61 is rendered in a waiting state as shown in FIG. 2G. In the waiting state, the fielder 61 holds the ball 70 in front of his chest and thereby keeps a state that the fielder 61 can immediately throw the ball 70 to a throwing destination upon its determination.

In this manner, where no manipulation is input by the user, the movement of the fielder 61 is expressed by motion that a natural transition is made from the throwing posture to the waiting state. The display control of the movement of the ball 70 is performed indirectly by these serial pieces of motion of the fielder 61.

Next, a description will be made of a case where the user inputs a manipulation for a throwing destination. FIGS. 3A–3G show example state transitions of pieces of motion from catching to throwing. FIGS. 3A–3G show pictures displayed on the display screen 101. In FIGS. 3A–3G, reference numeral 61 denotes a fielder, 62 denotes a glove, and 71 denotes a base.

Figure 3A:
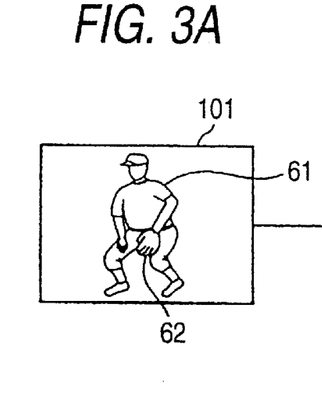
FIGS. 3A–3G illustrate an example of motion from catching to throwing according to an embodiment.

In FIG. 3A, the fielder 61 has a posture of preparing for a catch in a state that he wears the glove 62 on his left hand. If the fielder 61 can be manipulated, the user's manipulation input for the fielder 61 can be accepted even from a time when the ball 70 is batted by the batter or another fielder throws the ball 70. The user can specify a desired throwing destination by manipulating the keypad 50.

The throwing destination means a fielder, more specifically, a fielder that will cover the first base, a fielder that will cover the second base, a fielder that will cover the third base, or a fielder that will cover the home base. When the batted ball has reached the outfield and, for example, a manipulation has been made for the fielder that will cover the home base, a more realistic play can be expressed by causing a relay player to catch the ball.

If the fielder 61 has been determined as a player to catch the ball 70 and a manipulation for determining, as a throwing destination, a fielder that is covering the second base has been input, motion from catching to throwing is determined approximately at the same time as the determination of the fielder 61 as a player to catch the ball 70. As a result, motion of the fielder 61 from catching to throwing is started. A player that should catch the ball 70 is determined by computation by the computer. In the computation by the computer, in response to the user's manipulations (button manipulations, joystick manipulations, etc.) for fielders, a fielder that can reach the ball 70 earliest is determined from among one or more fielders close to the path of the ball 70.

In this example, the fielder 61 is determined as a player to catch the ball 70. The motion that is determined at this time is motion that is suitable for catching of the ball 70 and throwing of the ball 70 to the throwing destination specified by the user's manipulation input, that is, a fielder that is covering the second base. As for the management of motion, multiple kinds of motion may be associated with each fielder or motion may be shared by fielders. Associating multiple kinds of motion with each fielder independently makes it possible to emphasize a realistic expression. On the other hand, motion sharing among fielders makes it possible to simplify the data management and motion expressions.

Figure 3B:
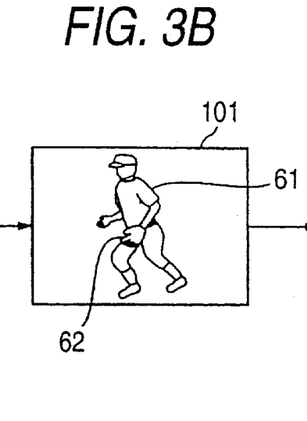

When the motion thus determined is started, as shown in FIG. 3B the motion control is passed to the computer and the fielder 61 is controlled so as to move toward a position to which the ball 70 will reach (rightward in the example of FIG. 3B).

Figure 3C:
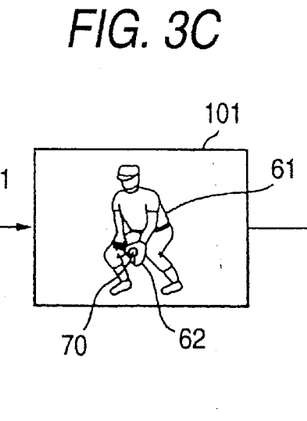

When the player 61 has reached the position of the ball 70 after moving to the path of the ball 70, the motion of fielder 61 catching the ball 70 is displayed as shown in FIG. 3C. At this time, the accuracy of the motion display is increased by correcting the position of the glove 62 by image processing. This may be done by predicting a position to which the ball 70 will reach and moving the glove 62 to that position.

Figure 3D:
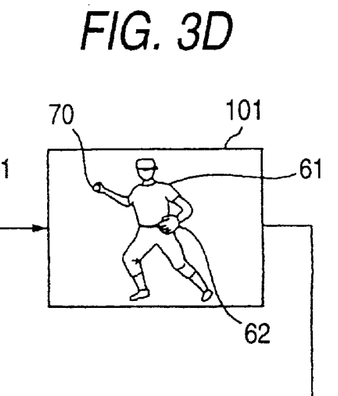

After the catch, as shown in FIG. 3D, the motion control makes a transition to throwing motion of the fielder 61. In this example, intermediate motion of the fielder 61 before throwing of the ball 70 to a fielder that will cover the second base is displayed.

Figure 3E:
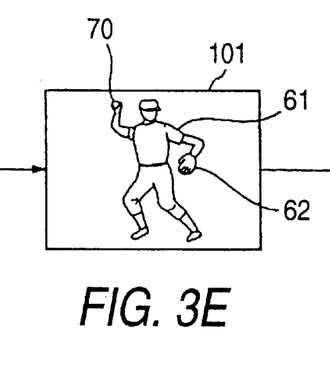
Figure 3F:
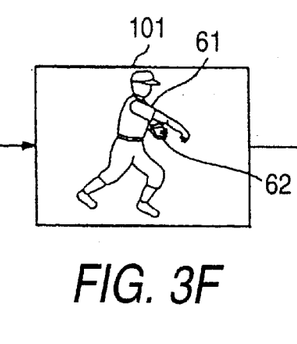

Then, as shown in FIG. 3E, the fielder 61 is given a posture immediately before throwing of the ball 70 to a fielder that will cover second base. Since, for example, a manipulation for designating, as a throwing destination, a fielder that will cover second base has been input before the fielder 61's catching the ball 70, as shown in FIG. 3F a transition is made to motion that the fielder 61 throws the ball 70 to the throwing destination, that is, a fielder that is covering second base.

Figure 3G:
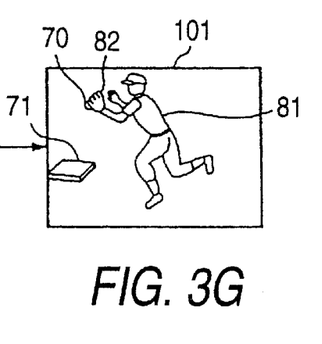

After the ball 70 has been thrown by the fielder 61, as shown in FIG. 3G the ball 70 is caught by a fielder 81 (throwing destination) that is covering second base. In this example, it is assumed that the fielder 81 covers second base 71. Therefore, as shown in FIG. 3G, a picture that the fielder 81 catches the ball 70 while running toward second base 71 is displayed. As for the movement of a fielder that will catch the ball, control may be so made that after the ball is batted each base is always covered by a proper fielder according to how the game proceeds like the fielder 81 does in this example.

As described above, if a manipulation of designating a fielder that will cover second base as a throwing destination is input, the motion of the fielder 61 is display-controlled so as to be suitable to throw the ball 70 to the fielder 81 that is covering second base 71. That is, where to throw the ball 70 has already been determined by the user's manipulation input before the fielder catches the ball 70. Therefore, the user need not time input of a manipulation (specifying of a throwing destination) with a catch by the fielder 61; the user can input a manipulation (specifying of a throwing destination) immediately after the batter bats the ball 70 by making an impromptu decision. This allows the user to specify a throwing destination at his thinking speed and hence without receiving any stress. Further, since motion can be determined from before a catch, transitions between serial pieces of motion from catching to throwing can be made smoothly.

FIGS. 3A–3G illustrate the case where the user's manipulation is input before a catch (i.e., before the state of FIG. 3A). Catching and throwing can be displayed with the most appropriate motion even if a manipulation is input at any time point before, for example, the state of FIG. 3C, 3D, or 3E. If a manipulation is input after the state of FIG. 3C, 3D, or 3E, satisfactory results are obtained by combining the motion so far made with motion that is suitable for the throwing destination. In this motion combining, the motion so far made and the motion suitable for the throwing destination may be combined with each other on the same time axis or the motion suitable for the throwing destination may be linked to the motion so far made so as to follow the latter.

In the example of FIGS. 3A–3G, a fielder that will cover second base is designated as a throwing destination. Another case in which a fielder that will cover another base is designated as a throwing destination will be described below with reference to FIG. 4A–4G.

Figure 4A:
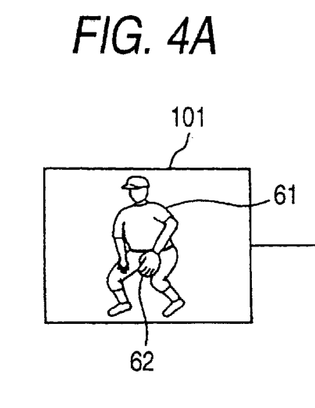
FIGS. 4A–4G illustrate another example of motion from catching to throwing according to an embodiment.
Figure 4B:
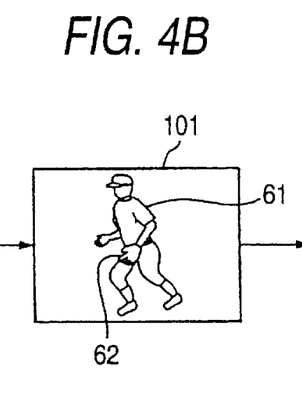
Figure 4C:
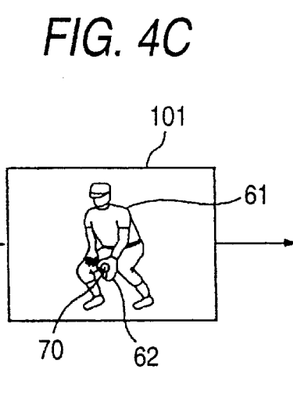

In this example, a fielder that will cover third base is designated as a throwing destination by the user's manipulation that is input immediately after the fielder 61 has caught the ball 70 (see FIG. 4C). The transitions between displayed pictures from the state of waiting for a catch to the state of a catch that are shown in FIGS. 4A–4C are the same as those shown by FIGS. 3A–3C and hence are not described here. In FIGS. 4A–4G, reference numeral 72 denotes a base, 91 denotes a fielder, and 92 denotes a glove.

Figure 4D:
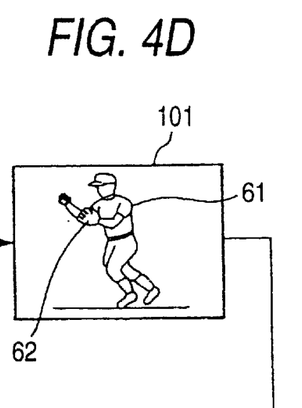
Figure 4E:
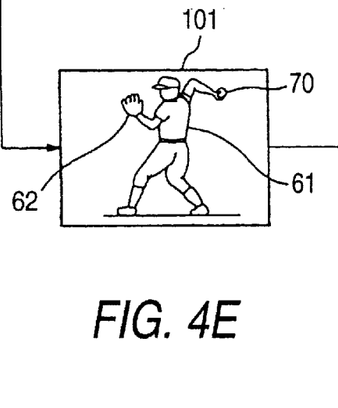

When a fielder that will cover third base has been designated as a throwing destination by the user's manipulation input, as shown in FIG. 4D motion that the fielder 61 pivots so as to be directed to the fielder that is covering the third base is displayed by motion combining. Then, a transition is made to motion that the fielder 61 throws the ball 70 to the fielder that is covering third base, as shown in FIG. 4E.

Figure 4F:
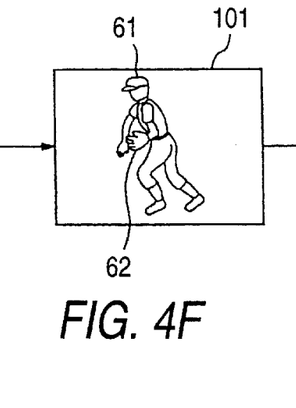
Figure 4G:
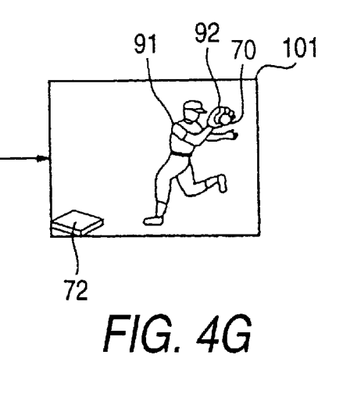

Then, the ball 70 is thrown and a posture of the fielder 61 after the throw is displayed on the display screen 101 as shown in FIG. 4F. Then, as shown in FIG. 4G, motion that a fielder 91 that is covering third base catches the ball 70 is displayed on the display screen 101. In this example, the fielder 91 catches the ball 70 while running toward third base.

As described above with reference to FIGS. 3A–3G and 4A–4G, specifying of a throwing destination can be accepted before the fielder 61 catches the ball 70. Even if a throwing destination is specified after the fielder 61 catches the ball 70, the motion of the fielder 61 can be expressed naturally by motion combining.

Figure 5:
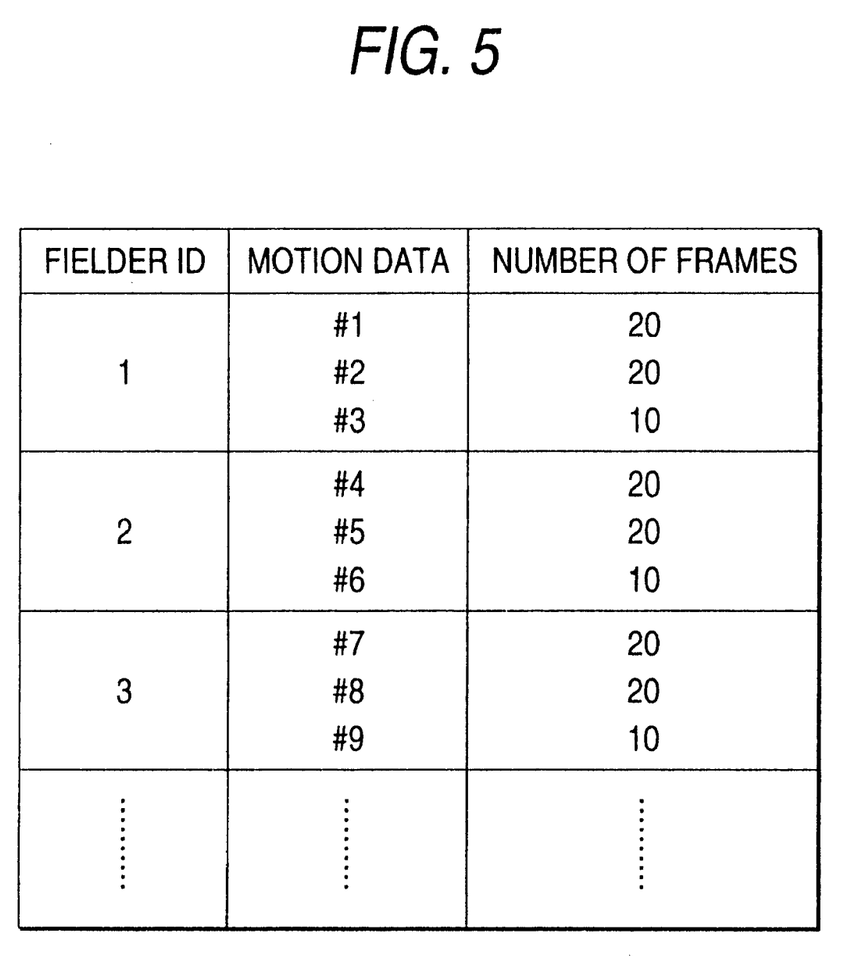
FIG. 5 schematically shows an example of a motion management table according to an embodiment.

Next, a description will be made of a method for managing pieces of motion corresponding to catching and throwing. FIG. 5 schematically shows an example of a motion management table according to the embodiment. As shown in FIG. 5, IDs (identification information) "1," "2," "3," . . . for identifying respective fielders are used. Each fielder ID is correlated with sets of motion data for drawing serial pieces of motion of the fielder and the number of frames that are necessary for drawing the series of pieces of motion. Where a baseball game program, for example, is stored in the CD-ROM 19, the motion management table is read from the CD-ROM 19 and then stored in the work area 13C of the RAM 13.

For example, three kinds of motion data #1, #2, and #3 are prepared for a fielder having an ID "1." Motion data #1, #2, and #3 are correlated with 20 frames, 20 frames, and 10 frames, respectively. If motion data #1 is employed, motion is reproduced by 20 frames.

For example, three kinds of motion data #4, #5, and #6 are prepared for a fielder having an ID "2." Motion data #4, #5, and #6 are correlated with 20 frames, 20 frames, and 10 frames, respectively. If motion data #4 is employed, motion is reproduced by 20 frames.

For example, three kinds of motion data #7, #8, and #9 are prepared for a fielder having an ID "3." Motion data #7, #8, and #9 are correlated with 20 frames, 20 frames, and 10 frames, respectively. If motion data #7 is employed, motion is reproduced by 20 frames.

Although omitted in FIG. 5, sets of motion data and the number of frames is similarly correlated with each of a fielder having an ID "4" and other fielders.

Next, the operation according to an embodiment will be described. FIGS. 6–9 are flowcharts showing the operation according to an embodiment. These flowcharts are directed to an example of motion of a player (fielder) that catches the ball when the batter bats the ball thrown by the pitcher or another fielder throws the ball being held by itself.

Figure 6:
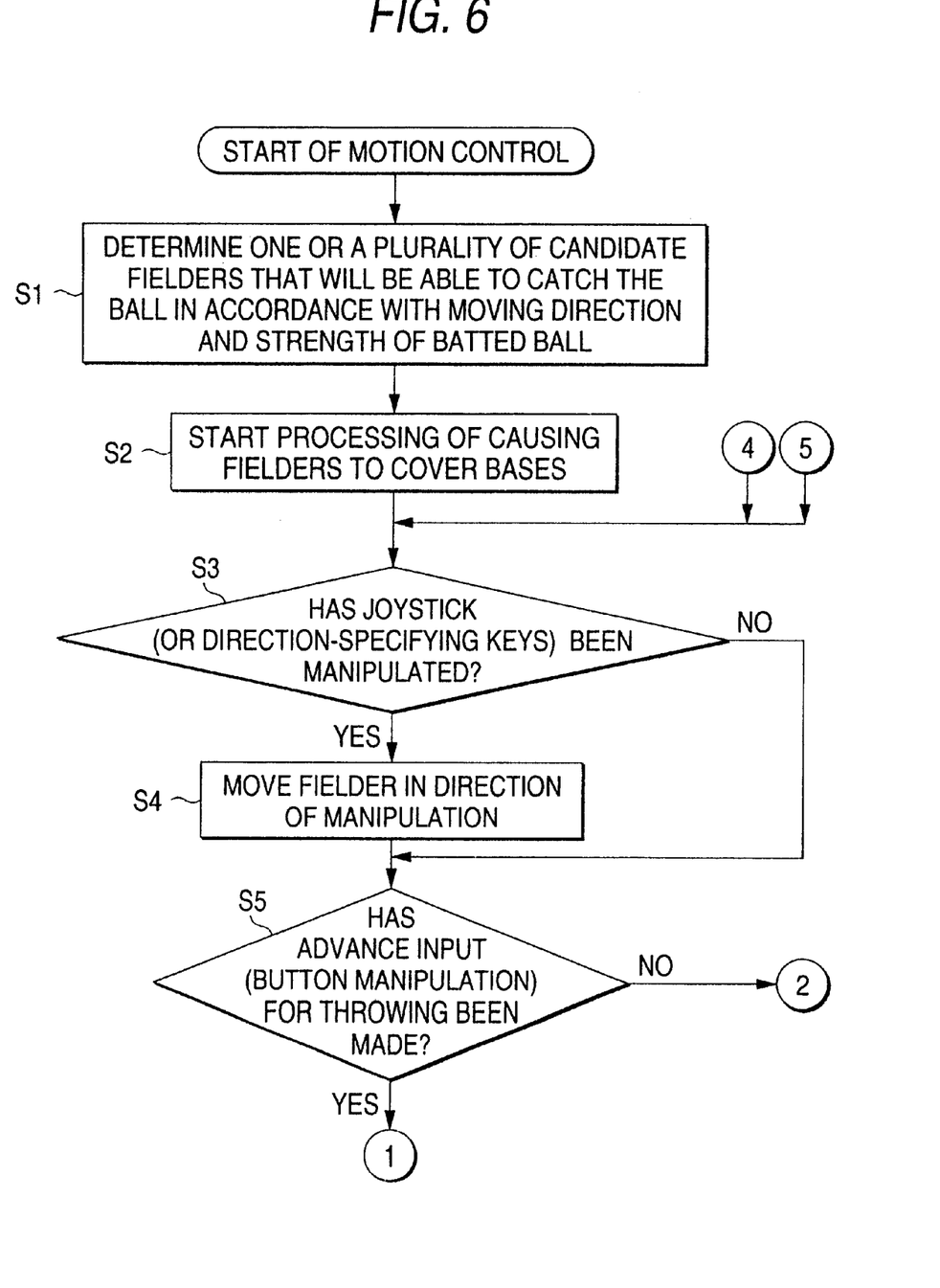
FIGS. 6–9 are flowcharts showing an example operation according to an embodiment.
Figure 7:
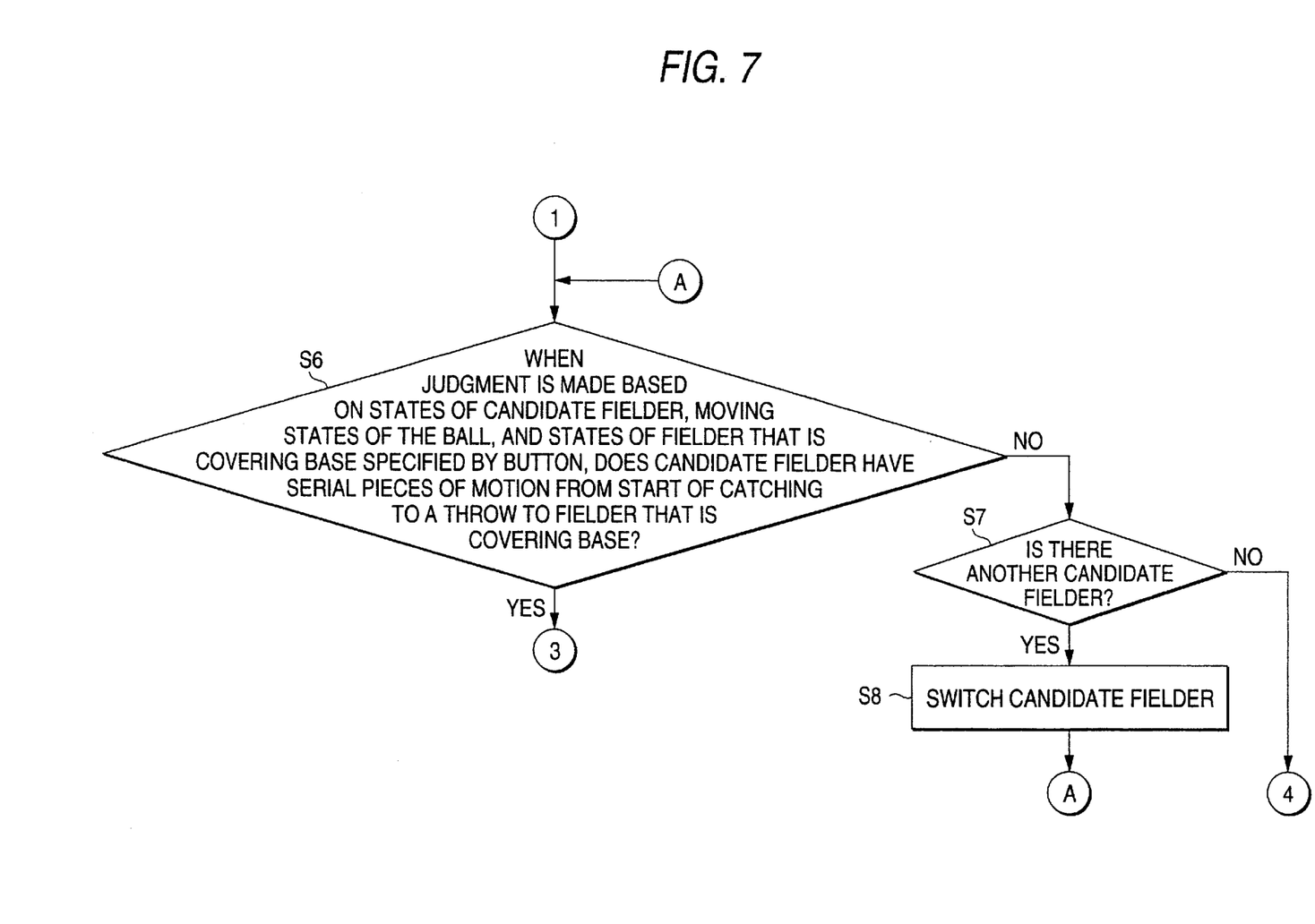
Figure 8:
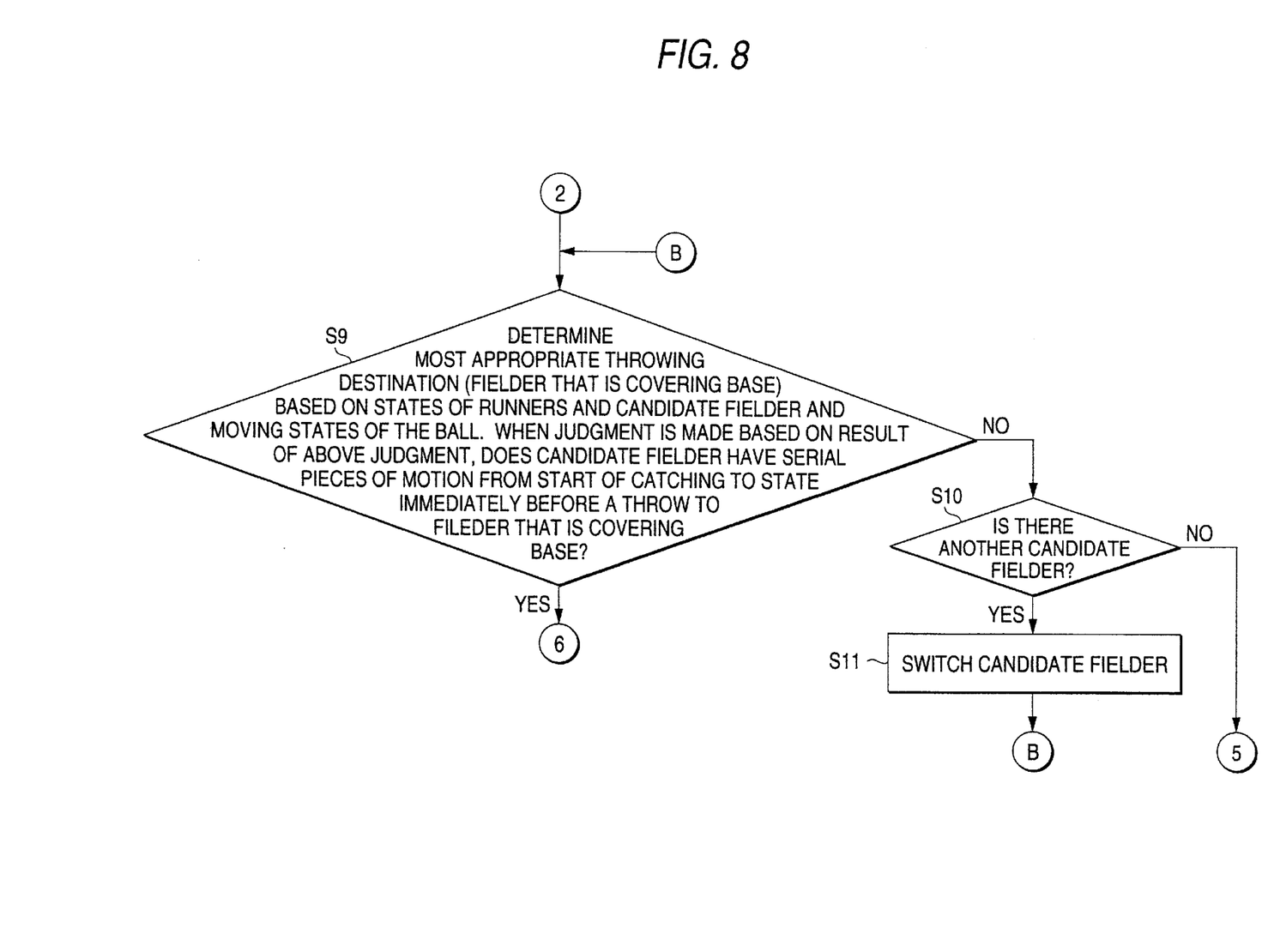
Figure 9:
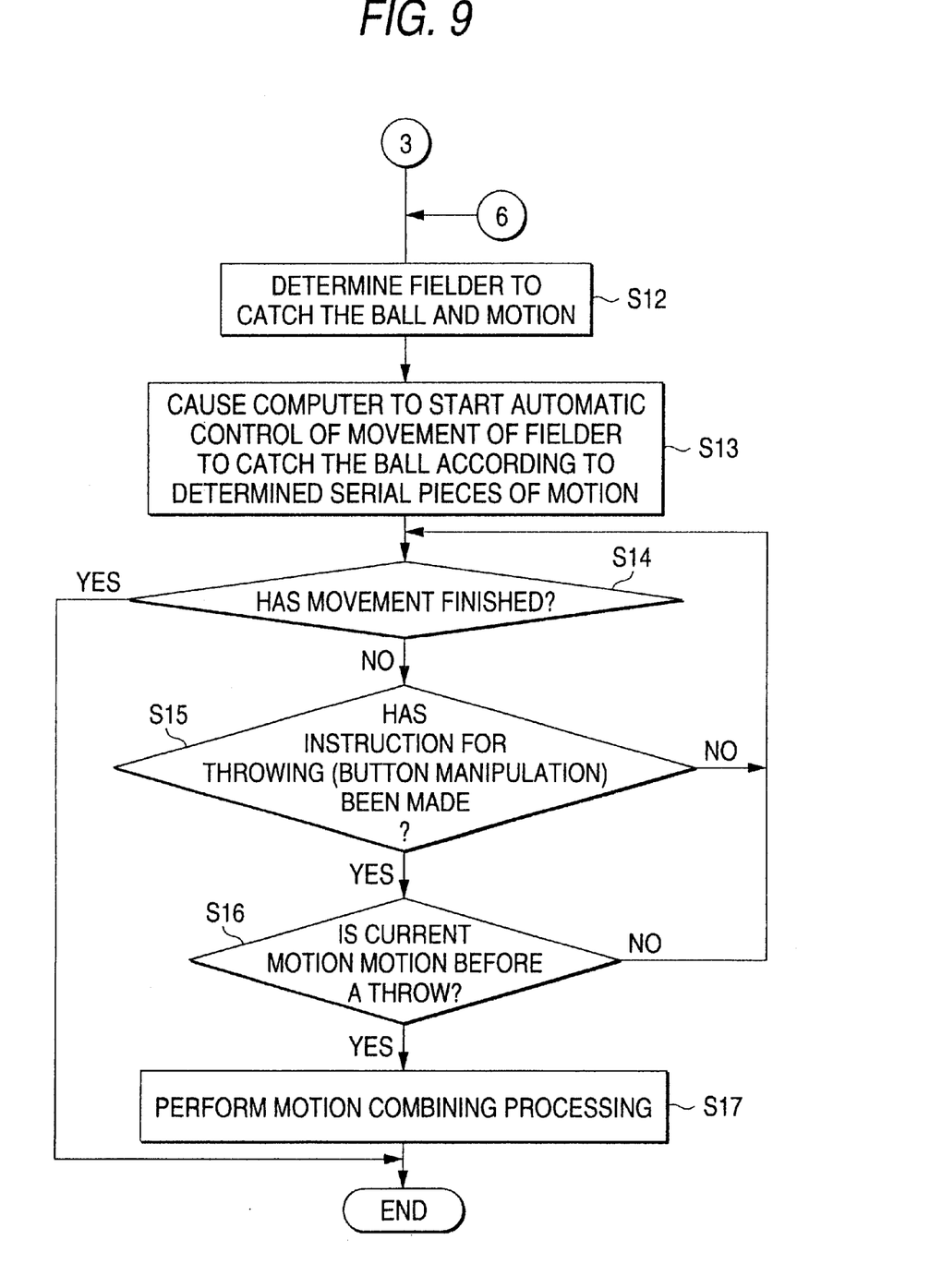

To make the flow of description more understandable, an operation will be described below starting from a time point when the batter bats the ball. First, at step S1, candidate fielders that will be able to catch the ball are determined in accordance with the moving direction of the ball that was batted by the batter. One or multiple fielders that are located in a range of 20–30 degrees with respect to the moving direction of the batted ball are selected as candidate fielders for catching. In the case of a bunt, the catcher, the pitcher, etc. are selected as candidate fielders for catching irrespective of the moving angle of the batted ball. In the case of an outfield fly, the infielders are excluded in determining candidate fielders. In the case of a line drive to the left field, only the left fielder is selected as a candidate fielder for catching.

At step S2, processing of causing fielders to cover the bases is started. At step S3, it is checked whether the joystick (or the direction-specifying keys) on the keypad 50 has been manipulated. If the joystick has been manipulated (yes at step S3), at step S4 processing of moving, on the ground, a player that has been selected as a manipulation subject in accordance with the manipulation is performed.

Where the joystick is used, the direction and the distance of a movement of the manipulation subject fielder are determined in accordance with the inclination state of the joystick. Where the direction-specifying keys that are associated with the top, bottom, left, and right directions are used, the manipulation subject fielder is moved in the direction corresponding to a manipulated key by a distance corresponding to a depression amount of the key.

When the joystick has not been manipulated (no at step S3) or step S4 has been executed, it is checked at step S5 whether an advance input for throwing was made. The advance input means a button manipulation that is performed by the user after the batting by the batter and before the catching by a fielder to make an instruction that the fielder should throw the ball to another fielder that will cover a specified base. This button manipulation enables a throw to one of fielders that will cover the first, second, third, and home bases, respectively.

In this case, where the respective buttons are correlated with the first, second, and third bases, and home plate, a manipulation on the button corresponding to first base means an advance input of an instruction to throw the ball to a fielder that will cover first base. The fielders that cover the respective bases vary according to how the game proceeds. Similarly, a manipulation on the button corresponding to second base means an advance input of an instruction to throw the ball to a fielder that will cover second base. A manipulation on the button corresponding to third base means an advance input of an instruction to throw the ball to a fielder that will cover third base. A manipulation on the button corresponding to home plate means an advance input of an instruction to throw the ball to a fielder that will cover home plate.

The relationship between the buttons and the throwing destinations is not limited to a one-to-one relationship; a throwing destination may be specified by a combination of two or more buttons or a combination of one button and the joystick.

If an advance input for throwing was made (yes at step S5), for example, states (position, posture, etc.) of the first candidate fielder, states (moving direction, force, etc.) of the batted ball, and states of covering of the fielder specified by the advance input are recognized. Whether the candidate fielder can catch the ball is judged based on recognition results.

Each candidate fielder is assigned in advance multiple kinds of serial pieces of motion for a continuous movement from a start of catching to a state immediately before a throw. At step S6, it is judged based on the recognition results whether the types of serial pieces of motion (see FIG. 5) of the candidate fielder include serial pieces of motion that enable a catch. This judgment is made based on whether it is predicted that the candidate fielder will be able to establish a catching posture on the moving path of the batted ball when the candidate fielder is moved by the number of frames (see FIG. 5) assigned to it.

If it is judged that the candidate fielder can reach the catching position by serial pieces of motion of the candidate fielder, since it is judged that the candidate fielder has consecutive pieces of motion that enable a catch (yes at step S6), at step S12 the serial pieces of motion are employed and the candidate fielder is determined as a fielder to catch the ball.

At step S13, the movement of the fielder to catch the ball is automatically controlled by the computer according to the serial pieces of motion that were determined at step S12. If it is judged at step S6 that the candidate fielder cannot reach the catching position by any serial pieces of motion of the candidate fielder (no at step S6), the process goes to step S7.

At step S7, it is judged whether another (i.e., the next) candidate fielder exists. If the next candidate fielder exists (yes at step S7), at step S8 switching is made to the next candidate fielder and the process returns to step S6. At step S6, the same processing as described above is performed for the candidate fielder to which switching was made at step S8.

If no proper serial pieces of motion are found even after repetitive execution of steps S6, S7, and S8, the process returns to step S3 to perform processing similar to the above.

If it is judged at step S5 that no advance input for throwing was made (no at step S5), it can be judged, based on, for example, relationships among the states (position, posture, etc.) of the first candidate fielder, the states (moving direction, force, etc.) of the batted ball, the states of covering fielders, and the states of runners, where the ball should be thrown, i.e., to a fielder covering the appropriate base. This is an example of processing in which the computer determines the most appropriate throwing destination.

For example, when the batted ball moves toward the shortstop in a state that a runner is on first base, the best judgment is that the shortstop should throw the ball to second base. When the batted ball is a grounder toward first base, the first baseman goes forward and starts catching motion. Therefore, the best judgment is that the pitcher should cover first base and the ball should be thrown to the pitcher.

Based on a result of the above judgment, it is judged whether the candidate fielder can catch the ball. As shown in FIG. 5, each candidate fielder is assigned in advance multiple kinds of serial pieces of motion from a start of catching to a state immediately before a throw. Naturally, when motion to a catch of the ball is to be employed, serial pieces of motion from a start of catching to a state immediately before a throw may be used. Therefore, at step S9, it is judged based on a result of the above judgment whether the types of serial pieces of motion of the candidate fielder include serial pieces of motion that enable a catch.

Prediction computation for each serial piece of motion of each candidate fielder is the same as described in connection with step S6, and hence is not described here. If it is judged that the candidate fielder has serial pieces of motion that enable a catch (yes at step S9), at step S12 the serial pieces of motion is employed and the candidate fielder is determined as a fielder to catch the ball. At step S13, the movement of the fielder to catch the ball is automatically controlled by the computer according to the serial pieces of motion that were determined at step S12.

If it is judged at step S9 that the candidate fielder does not have any serial pieces of motion that enable a catch (no at step S9), it is judged at step S10 whether another (i.e., the next) candidate fielder exists. If the next candidate fielder exists (yes at step S10), at step S11 switching is made to the next candidate fielder and the process returns to step S9. At step S9, the same processing as described above is performed for the candidate fielder to which switching was made at step S11.

If no proper serial pieces of motion are found even after repetitive execution of steps S9, S10, and S11 (no at step S10), the process returns to step S3 to perform processing similar to the above.

After the movement of the fielder to catch the ball is started at step S13, it is judged at step S14 whether the movement has finished. If it is judged at step S14 that the movement has finished (yes at step S14), the process is finished. On the other hand, if the movement has not finished yet (no at step S14), the process goes to step S15. When the process reached step S12 from step S6, in the judgment at step S14 completion of throwing means the end of the movement (see FIGS. 3A–3G and 4A–4G, for example) because motion from catching to throwing should be processed. On the other hand, when the process reached step S12 from step S9, completion of catching means the end of the movement because motion to a catch should be processed (see FIGS. 2A–2G, for example).

At step S15, it is judged whether an instruction for throwing has been made during processing of motion to the state immediately before a throw, that is, whether a button manipulation has been made. If it is judged that no button manipulation has been made (no at step S15), the process returns to step S14, where whether the movement has finished is judged again. On the other hand, if is it judged that a button manipulation has been made (yes at step S15), with an understanding that an instruction to throw the ball has been input, it is judged at step S16 whether the motion currently processed is motion before a throw. This judgment is made based on how the serial pieces of motion are proceeding.

For example, if the judgment result is "after a throw" (no at step S16), the process returns to step S14. If the motion currently processed is motion after a throw, processing is executed to continue the control to a state immediately before the throw and render the movement of the fielder that caught the ball in a neutral state. The neutral state means a state that the fielder that caught the ball is given a posture that, for example, the ball is set in front of the chest so that the fielder can throw the ball any time, rather than a motion of throwing the ball. As a result, it is judged at step S14 that the movement has finished (yes at step S14) and the process is finished. However, in this case, after establishment of the neutral state, motion of throwing the ball to a throwing destination specified by a button manipulation will be processed later.

If it is judged at step S15 that an instruction for throwing has been made (yes at step S15) and it is judged at step S16 that the current motion is motion before a throw (yes at step S16), at step S17 motion to a throw is processed by combining motion suitable for the current throwing destination and motion suitable for the throwing destination (determined by a button) of the throwing instruction that was made at step S15.

At step S17, it is judged, based on the button manipulation that was recognized at step S15, what button was manipulated, and it is also judged, based on the thus-determined button, throwing to a player to cover which base was instructed. The final throwing destination is determined based on a result of this judgment.

If it is judged at step S17 that the current throwing destination coincides with the throwing destination (determined by a button) of the throwing instruction that was recognized at step S15, the throwing destination is not changed and the processing is performed with an understanding that the throwing instruction instructs to throw the ball to the same destination as the current one. On the other hand, if it is judged that the current throwing destination does not coincide with the throwing destination of the throwing instruction, instructions to change the throwing destination motion to throw the ball to the destination recognized at step S15 are generated.

After motion to combine has been determined in this manner, the movement of the fielder that caught the ball is controlled automatically by the computer until completion of throwing while the thus-determined serial pieces of motion are combined with the current motion.

As described above, according to the embodiment, in a baseball game, it becomes possible to improve the balance between the movements of displayed fielders and the ease of operation of a user, to thereby realize smooth development of the game.

Although the embodiment is directed to a baseball game as an example of ball-game-type games, the invention is not limited to it. The invention can also be applied to games of other ball games such as soccer, basketball, American football, tennis, and ice hockey as long as the ball is sent to an arbitrary direction according to a user's manipulation.

The invention can be applied to game-dedicated machines, arcade machines, personal computers, personal digital assistants, cellular telephones, etc.

Although in the embodiment a program for implementing the embodiment is recorded on a CD-ROM or hard disks, the invention is not limited to such a case. A program may be recorded on any other computer-readable recording media such as a magneto optical (MO) disk and a DVD. Where a program is downloaded to hard disks, a commercial network, the Internet, an intranet, an extranet, or the like may be used as the network 111.

As described above, the invention provides an advantage that there can be provided a ball-game-type game program, a computer-readable recording medium on which such a program is recorded, and a ball-game-type game processing apparatus and method which can improve the balance between the movements of displayed players and the ease of operation of a user, to thereby realize smooth development of the game.

What is claimed is:

1. A computer-readable recording medium on which a ball-game-type game program for realizing a ball-game-type game in which movements of players and a ball on a screen are controlled, the program causing a computer to execute:
    accepting input of a manipulation by a user before a player receives a ball;
    judging, in response to the input of the manipulation by the user, a direction in which the player should move the ball; and
    displaying motion of the player moving the ball in the judged direction.

2. A computer-readable recording medium on which a ball-game-type game program for realizing a ball-game-type game in which movements of players and a ball on a screen are controlled, the program causing a computer to execute:
    accepting input of a manipulation by a user before a player receives a ball;
    when the input of the manipulation by the user is accepted before the player receives the ball, judging, in response to the input of the manipulation by the user, a direction in which the player should move the ball; and
    displaying motion of the player moving the ball in the judged direction, the motion starting from a state before the player receives the ball.

3. The recording medium according to claim 1, wherein the program further causes the computer to execute displaying a movement of the ball in such a manner that the movement of the ball conforms to the motion of the player.

4. A ball-game-type game processing apparatus comprising:
    a computer-readable recording medium on which a program for realizing a ball-game-type game in which a movement of a ball is controlled indirectly so as to conform to a movement of a player;
    a computer for reading and executing at least part of the program; and
    a display for displaying the ball-game-type game realized by the program,
    wherein the computer, by reading the at least part of the program from the recording medium, executes:
    accepting input of a manipulation by a user before a player receives a ball;
    judging, in response to the input of the manipulation by the user, a direction in which the player should move the ball; and
    displaying, on the display, motion of the player moving the ball in the judged direction.

5. A ball-game-type game processing apparatus comprising:
    a computer-readable recording medium on which a program for realizing a ball-game-type game in which a movement of a ball is controlled indirectly so as to conform to a movement of a player;
    a computer for reading and executing at least part of the program; and
    a display for displaying the ball-game-type game realized by the program,
    wherein the computer, by reading the at least part of the program from the recording medium, executes:
    accepting input of a manipulation by a user before a player receives a ball;
    when the input of the manipulation by the user is accepted before the player receives the ball, judging, in response to the input of the manipulation by the user, a direction in which the player should move the ball; and
    displaying, on the display, motion of the player moving the ball in the judged direction, the motion starting from a state before the player receives the ball.

6. The ball-game-type game processing apparatus according to claim 4, wherein the computer further executes displaying, on the display, a movement of the ball in such a manner that the movement of the ball conforms to the motion of the player.

7. A ball-game-type game processing method for realizing a ball-game-type game in which movements of players and a ball on a screen are controlled, comprising:
    accepting input of a manipulation by a user before a player receives a ball;
    judging, in response to the input of the manipulation by the user, a direction in which the player should move the ball; and displaying motion of the player moving the ball in the judged direction.

8. A ball-game-type game processing method for realizing a ball-game-type game in which movements of players and a ball on a screen are controlled, comprising:

accepting input of a manipulation by a user before a player receives a ball;

when the input of the manipulation by the user is accepted before the player receives the ball, judging, in response to the input of the manipulation of the user, a direction in which the player should move the ball; and displaying motion of the player moving the ball in the judged direction, the motion starting from a state before the player receives the ball.

9. The ball-game-type game processing method according to claim 7, further comprising displaying a movement of the ball in such a manner that the movement of the ball conforms to the motion of the player.

10. The ball-game-type game processing method according to claim 8, further comprising displaying a movement of the ball in such a manner that the movement of the ball conforms to the motion of the player.

11. The recording medium according to claim 2, wherein the program further causes the computer to execute displaying a movement of the ball in such a manner that the movement of the ball conforms to the motion of the player.

12. The ball-game-type game processing apparatus according to claim 5, wherein the computer further executes displaying, on the display, a movement of the ball in such a manner that the movement of the ball conforms to the motion of the player.

* * * * *

UNITED STATES PATENT AND TRADEMARK OFFICE
CERTIFICATE OF CORRECTION

PATENT NO. : 6,471,585 B1
DATED : October 29, 2002
INVENTOR(S) : S. Rimoto et al.

It is certified that error appears in the above-identified patent and that said Letters Patent is hereby corrected as shown below:

<u>Title page,</u>
Item [*], Notice, "18 days" should be -- 26 days --.

Signed and Sealed this

Third Day of June, 2003

JAMES E. ROGAN
*Director of the United States Patent and Trademark Office*